(12) United States Patent
Kundu et al.

(10) Patent No.: US 7,890,466 B2
(45) Date of Patent: Feb. 15, 2011

(54) TECHNIQUES FOR INCREASING THE USEFULNESS OF TRANSACTION LOGS

(75) Inventors: Joydip Kundu, Nashua, NH (US);
Qinqin Wang, Nashua, NH (US);
Goutam Kulkarni, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 2192 days.

(21) Appl. No.: 10/414,591

(22) Filed: Apr. 16, 2003

(65) Prior Publication Data

US 2004/0210577 A1    Oct. 21, 2004

(51) Int. Cl.
*G06F 7/00* (2006.01)
(52) U.S. Cl. ...................................... 707/648
(58) Field of Classification Search .............. 707/8, 707/206, 103, 648
See application file for complete search history.

(56) References Cited

U.S. PATENT DOCUMENTS

| 5,317,731 | A | * | 5/1994 | Dias et al. ................. 707/8 |
| 5,907,848 | A | * | 5/1999 | Zaiken et al. ............ 707/202 |
| 6,122,640 | A | * | 9/2000 | Pereira ................. 707/103 R |

* cited by examiner

*Primary Examiner*—Wilson Lee
*Assistant Examiner*—Michael Le
(74) *Attorney, Agent, or Firm*—Vista IP Law Group, LLP.

(57) ABSTRACT

Techniques for making light-weight checkpoints in logs of streams of transactions and for extending the logs from the checkpoints. The state saved in the light weight checkpoint need only include the state of all transactions that are active at a prior point in the log and are still active at the checkpoint. A log is extended from the checkpoint by processing new transactions in the transaction stream beginning at the prior point to produce the extending log. When the checkpoint is reached, the state saved at the checkpoint is used to continue to produce the extending log. Techniques are further disclosed for selecting points in the stream of transactions at which the checkpoints may be made and for determining the distance between checkpoints. As disclosed, the log in which the checkpoints are used is a logical log made from a physical log produced by a relational database system. The logical log may be used for replication and for data mining.

64 Claims, 10 Drawing Sheets

```
boolean ForceCheckPoint_krvxsctx;                                    /- 705
ub4 CountTroubleMaker_krvxsctx;——— 707 builder_code()
  {
     ....
     if (I see a start of a chained redo/undo)
     ++CountTroubleMaker_krvxsctx;——————— 709
     if(I see an END of a chained redo/undo)
     {
        --CountTroubleMaker_krvxsctx;—— 711
        if (0 == CountTroubleMaker_krvxsctx && TRUE ==
ForceCheckPoint_krvxsctx)
                                        713      ,- 715
        {
        -- add a TAKE_CHECKPOINT transaction chunk in the txn queue
        client is supposed to call us back with krvxpci() to tell us
about its checkpoint information.
                                        ,- 717
           ForceCheckPoint_krvxsctx = FALSE;
        }
     }
  }

At some periodic interval (set by the client dynamically), the
  following
  function is called from the builder
  checkpoint_if_you_can()
  {
                                              ,- 721
     if (0 == CountTroubleMaker_krvxsctx)
        do_checkpoint();
     else
        ForceCheckPoint_krvxsctx = TRUE;——— 723
  }
```

Fig. 7

| Column Name | NULL? | Data Type | Description |
|---|---|---|---|
| Session# | NOT NULL | Number | Identifies the session associated with the checkpoint. There can be multiple log mining sessions active in the database, each mining a different set of redo logs |
| Checkpt_scn | NOT NULL | Number | SCN at which the checkpoint is taken. By definition this is a safe scn. |
| XIDUSN | NOT NULL | number | These three columns together form a unique transaction identifier |
| XIDSLT | NOT NULL | number | |
| XIDSQN | NOT NULL | number | |
| STATE | NOT NULL | Number | Identifies whether the checkpoint contains the client info or not. A checkpoint is taken in two steps. First the database takes the checkpoint and fills out the CKPT_DATA column for all transactions. In the first step, STATE column is set to indicate that checkpoint does not contain the client data. In the next step the client can specify any information that needs to be stored per transaction for the checkpoint. At this time STATE is updated to indicate that the checkpoint contains the client data. |
| CKPT_DATA | | BLOB | Contains internal checkpoint information |
| CLIENT_DATA | | BLOB | Contains client-specific information for this checkpoint |

CPTR 813

Fig. 9

Transaction Structure Definition

| | Field Name | Description |
|---|---|---|
| 1003 | Identifier | Uniquely identifies the transaction. Consists of XIDUSN, XIDSLT, XIDSQN fields specified in the table definition |
| 1005 | Property | Lists the transaction property. Later processing takes advantage of the property fields during log mining. |
| 1007 | Start_time | Time when this transaction started |
| 1009 | Low_scn | SCN of the earliest LCR contained within this transaction |
| 1011 | High_scn | SCN of the latest LCR contained within this transaction |
| 1013 | Num_lcr | How many LCRs are contained within this transaction |

411

Logical Change Record (LCR) Structure Definition

| | Field Name | Description |
|---|---|---|
| 1015 | Operation | User-level operation (like INSERT, UPDATE, DELETE, DDL etc) associated with this LCR |
| 1017 | Num_pcr | Number of PCRs associated with this LCR |
| 1019 | Txn_id | Transaction identifier associated with this LCR. This is the same for all LCRs associated with the same transaction and equals the id in the transaction structure. |
| 1021 | Object_number | Each LCR is associated with the change made to base database object (this refer to the internal number that is associated with a database table) |
| 1023 | Object_version | The version determines the base database object definition (like how many columns the base table contains etc) |
| 1025 | Low_scn | An LCR can be made of different "redo records". The low_scn is the SCN of the earliest "redo record" associated with the LCR |
| 1027 | High_scn | An LCR can be made of different "redo records". The high_scn is the SCN of the latest "redo record" associated with the LCR |
| 1029 | Property | Other information about the LCR |
| 1031 | PCR_ptr | Pointer to this LCR's PCRs. |

311

Physical Change Record (PCR) Structure Definition

| | Field Name | Description |
|---|---|---|
| 1033 | First_Column | A PCR contains data associated with multiple columns. First_column identifies the column with the lowest number |
| 1035 | Data_ptr | Pointer to a byte stream that encodes the data stored in PCR |
| 1037 | Data_size | Number of bytes pointed to by data_ptr |

TECHNIQUES FOR INCREASING THE USEFULNESS OF TRANSACTION LOGS

CROSS REFERENCES TO RELATED APPLICATIONS

BACKGROUND OF THE INVENTION

1. Field of the Invention

The invention relates generally to the redo logs used in database systems to log the transactions performed by the database system and more specifically to increasing the usefulness of redo logs for purposes such as data mining and replication of transactions.

2. Description of Related Art: FIG. 1

Nowadays, businesses, governments, and large organizations generally are completely dependent on their database systems. If the database system fails, the organization cannot operate. Because organizations depend so completely on their database systems, the database systems must be reliable. One way in which reliability is achieved in database systems is careful design to reduce hardware and software failures; another is redundancy of hardware and data so that hardware and software failures do not result in loss of data or of service; still another is recoverability, so that when a failure does occur, the database system can be restarted without loss of data. A technique that is commonly used to achieve recoverability is logging; whenever the database system performs a transaction, it logs the results of the operations making up the transaction in a file. The result of the logging operation is a transaction log that records operations belonging to a stream of transactions performed by the database system. When a failure occurs, the transactions in the stream that were performed up to the point of the failure can be recovered by redoing the operations specified in the log file. For this reason, such transaction logs are often termed redo logs.

To limit the amount of redo log that must be read to redo changes, redo logs contain checkpoints. A checkpoint represents a point in the transaction stream and provides access to data that permits a redo log to be made beginning at the checkpoint which extends the redo log containing the checkpoint. From the checkpoint on, the contents of the extending redo log are exactly equivalent to what the contents of the original redo log would have been following the checkpoint. Thus, to restore a database system from the redo log after a failure, one need not begin the restoration at the beginning of the redo log, but may instead begin at the first checkpoint preceding the failure and make an extending redo log by restoring the checkpoint's data and making the extending redo log from the checkpoint. A simple way of making a checkpoint is to save data at the checkpoint which represents the current state of all transactions that are active (i.e. uncommitted) when the checkpoint is made. In database systems that handle a large number of transactions, making such a checkpoint is expensive both as regards the time required to make the checkpoint and as regards the checkpoint's size.

While redo logs were originally developed to permit recovery from failures, both the designers of the database systems and their users soon realized that the information contained in the logs could be put to other uses. There are two broad categories of such uses: data mining and replication. Data mining takes advantage of the fact that a redo log necessarily contains a complete record over the period during which the redo log was made of the operations performed by the database system on the data stored in the database system. One use of such information is to tune the database system for more efficient performance; another is to analyze the kinds of transactions being made by users of the database system over a particular period. For example, if the database system keeps track of the sales of items of merchandise, the redo log could be examined to see whether a TV promotion of a particular item of merchandize had any immediate effect on sales of the item.

Replication is an extension of the original purpose of the redo log. When a redo log is used for recovery, what is actually done is that the database system is put into the condition it was in at the point at which the redo log begins and the operations that are recorded in the redo log are replicated in the database system. In the same manner, the redo log can be used to propagate changes to other database systems for example, if an organization has a main personnel database system at headquarters and local personnel database systems at various branches, the redo log from the main database system can be used to replicate the operations performed at the main database system in each of the branch database systems, so that what is in the local database systems continues to correspond to what is in the headquarters personnel database system.

Originally, the information in the redo logs was copied from the database system at an extremely low level. For example, in relational database systems, the data in the database systems is organized into tables. Each table has a name by which it is known in the database system. Each table further has one or more named columns. When the table contains data, the table has one or more rows, each of which contains fields corresponding to each of the columns. The fields contain data values. The data base system's tables are in turn defined in other tables that belong to the database system's data dictionary. To perform an operation in a database system, one specifies the operation in terms of table names and column names. The actual data specified in the tables is, however, contained in data blocks in the database system, and whenever a data block was changed in the database system, a copy of the changed data block was written to the redo log.

Redo logs that record changes at the data block level are termed herein physical redo logs. A log miner could of course always begin with a copy of a data block from a physical redo log and use information from the data dictionary to determine what table the changed data block belonged to and from the kind of change what kind of database operation had been performed, but doing so was time consuming and mistake prone. As for replication, the fact that the changes were recorded at the data block level meant that the physical redo log could be used for replication only in database systems that were substantially identical to the one in which the redo log had been made.

To make redo logs easier to use for data mining and replication, database system designers began making redo logs that not only indicated what change had been made, but also described the operation in terms of a query language command and the names of the tables and columns affected by the operation. Such redo logs indicate not only the physical change, but also the logical database operation that brought it about, and are termed herein logical redo logs. Logical redo logs are much easier to analyze than physical redo logs, and as long as a particular database system can perform the logical operations specified in the logical redo log, the logical redo log be used to make a replica of a set of changes in the particular database system. Typically, logical redo logs are made only of those parts of the physical redo log which the user needs for a particular purpose and are made from the physical redo log when required. Like physical redo logs, logical redo logs may have checkpoints to reduce the amount of physical redo log that must be read to make a particular logical redo log.

FIG. 1 shows a database management system (DBMS) 101 that makes and consumes logical redo logs. Major components of DBMS 101 are database storage 113, where data including the information needed to define DBMS tables 115 and the data values located via the tables are stored, and DBMS interface 105, which is the interface between DBMS 101 and programs which use DBMS 101 to store and retrieve data. The basic operations performed on DBMS system 101 are queries 107, which specify fields to be read or written in DBMS tables 115 by table name and column name. The queries return results 109. In typical relational database systems, the queries are written using the standard structured query language (SQL). SQL contains two sublanguages: DML, which specifies operations on data in the DBMS tables, and DDL, which specifies operations on the definitions of the DBMS tables.

Another kind of operation which is significant for the current discussion is logical redo log operations 111, which manipulate logical redo logs. As shown at 103($a$) and ($b$), a logical redo log may be produced and/or consumed by DBMS 101. Logical redo logs are produced and consumed by DBMS 101 as required for data mining or replication operations. When a redo log 103 is used for data mining, a redo log operation 111 converts the redo log to a redo log table 117, which can then be queried like any other table 115 in DBMS 101.

A detail of a part of a logical redo log 103 is shown at the bottom of FIG. 1. The logical redo log is made up of a sequence of transactions 121. Each transaction 121 is made up of a series of data items that typically represent the following:

the DML for an operation in the transaction;

the changes resulting from the DML;

that the changes specified in the transaction have been committed, that is, actually made in the database system.

Thus, a DML operation 120 is represented in the transaction by the DML language 118 for the operation and the new values 118 resulting from the operation; when a transaction 121 has been committed, it has a committed data item 122. Additionally, a logical redo log 103 may contain one or more checkpoints 123.

While logical redo logs have made the information contained in physical redo logs much more accessible and usable, problems still remain in the area of checkpointing. Among them are:

reducing the amount of state that is saved in the checkpoint; and determining points in the transaction stream at which a checkpoint may be safely made.

The problems with checkpointing result in two further problems with logical redo logs:

when mining the logical redo log, the user cannot extend the range of physical redo log records being mined during a mining session; and the user cannot tune checkpoint insertion such that restoring a system using the logical redo log takes a relatively constant amount of time.

It is an object of the techniques disclosed herein to solve these and other problems of redo logs and of logs of streams of transactions generally.

SUMMARY OF THE INVENTION

In one aspect, the techniques provide light-weight checkpoints in logs of streams of transactions. A light-weight checkpoint is made by selecting a point in the stream at which a checkpoint is to be made in the log and then saving state in the checkpoint, the state that is required to be saved being only the state of all transactions that are active both at the point and at a prior point in the stream. The light-weight checkpoint may further contain client-defined state in addition to the state needed for the checkpoint.

The light-weight checkpoint is used to make a log of a stream of transactions that extends a previously-made log that contains the checkpoint. The extending log is made beginning at the prior point in the previously-made log, and when the checkpoint is reached, using the saved state to which the checkpoint gives access to continue making the extending log. Until the checkpoint is reached, the extending log may contain only the transactions that become active after the prior point. The distance between the checkpoints in the log may be determined by a mean amount of time needed to make the extending log from the previous point to the checkpoint.

In another aspect, the techniques select "safe" locations for checkpoints. A location is safe if it is a point in the transaction stream at which no operation is unfinished within a transaction belonging to the stream. If the transaction stream is a redo log for a database system, a location is further safe if no transaction which affects the data dictionary is uncommitted.

In a further aspect, the technique is used to make checkpoints in a logical log of the stream of transactions. The logical log is made from a physical log of the stream of transactions. An extending logical log is made using a checkpoint by beginning to construct the extending logical log from the physical log at the prior point. When the checkpoint is reached, the state saved at the checkpoint is used to continue making the extending logical log from the physical log. The extending logical log may be used for replication or it may be used to extend the range of a data mining operation.

Other objects and advantages will be apparent to those skilled in the arts to which the invention pertains upon perusal of the following Detailed Description and drawing, wherein:

BRIEF DESCRIPTION OF THE DRAWING

FIG. 7 shows how a checkpoint SCR is inserted into the physical redo log in a preferred embodiment;

FIG. 9 is a detail of a row of LogMiner checkpoint table 811; and

FIG. 10 shows details of the transaction structure, the LCR, and the PCR in a preferred embodiment.

Figure 1:
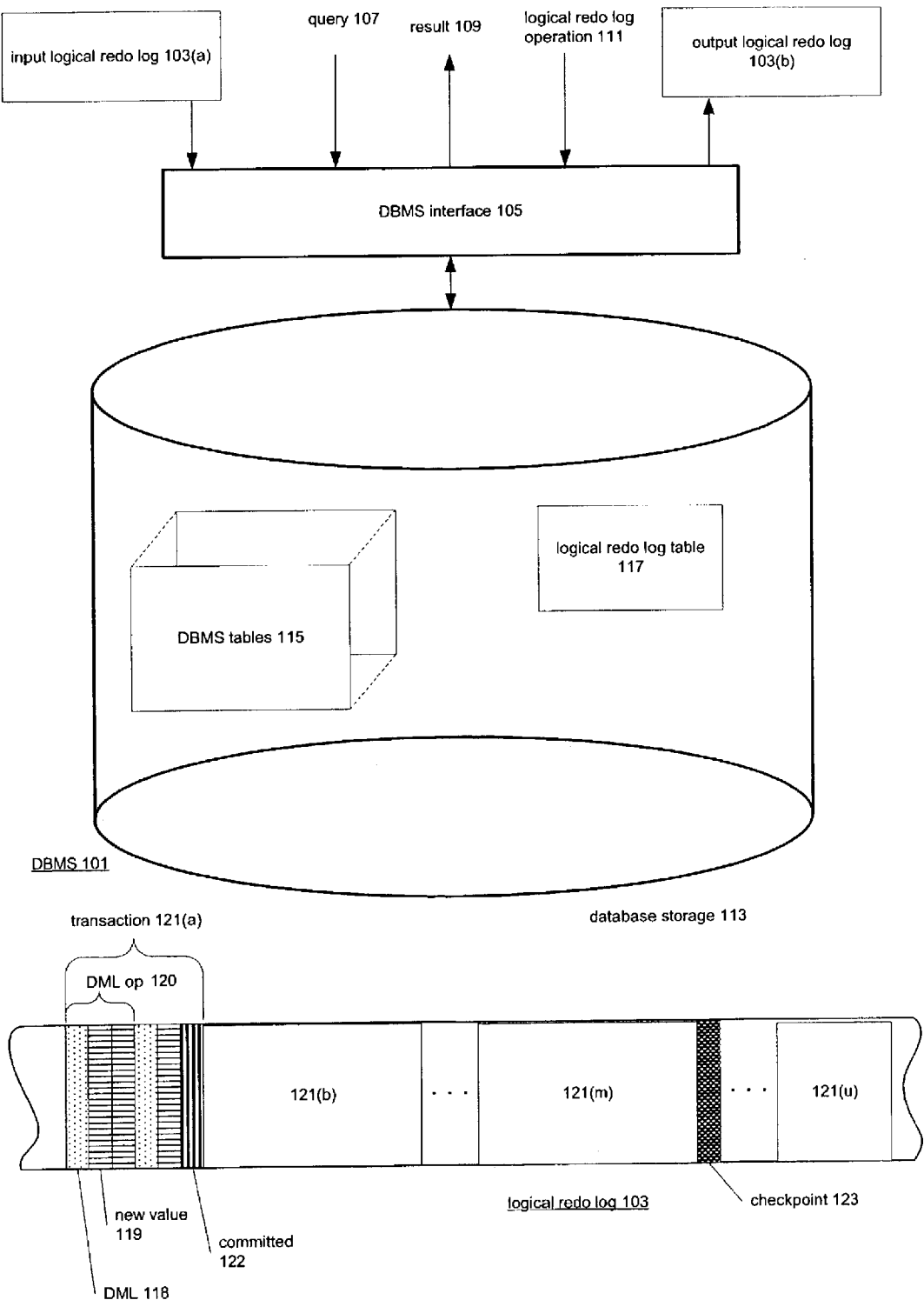
FIG. 1 is a schematic diagram of a prior-art DBMS system that produces and consumes logical redo logs.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will begin with an overview of a DBMS in which the invention is implemented and will then describe in detail how the logical redo log is made from the physical redo log, how light-weight checkpoints are made and used in the logical redo log, how locations in the logical redo log for checkpoints are determined, and how checkpoints are used in data mining and replication and will finally describe a user interface for specifying how to determine where checkpoints are to be inserted into the logical redo log.

Figure 2:
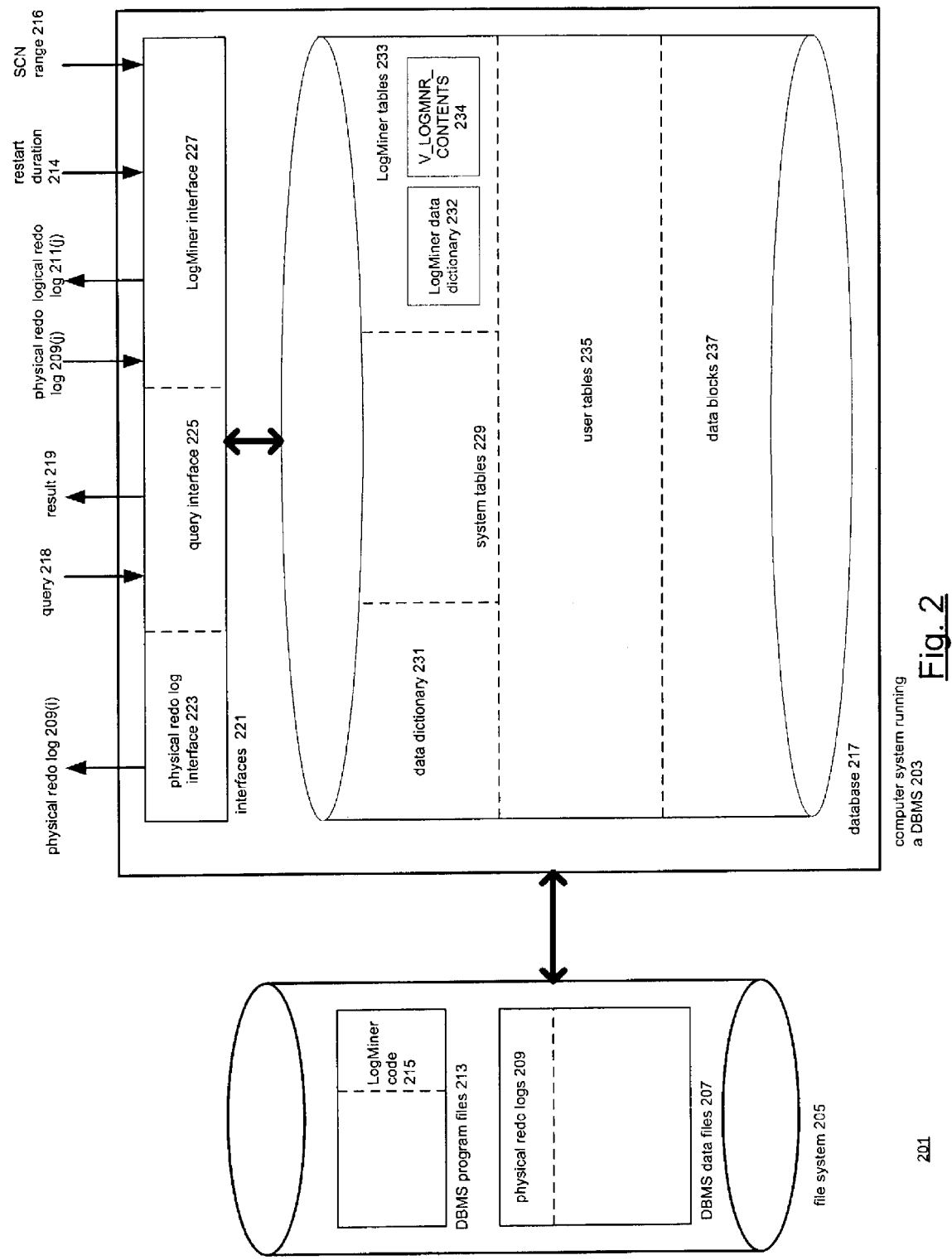
FIG. 2 is a schematic diagram of a DBMS system in which the inventions described herein are implemented.
Figure 8:
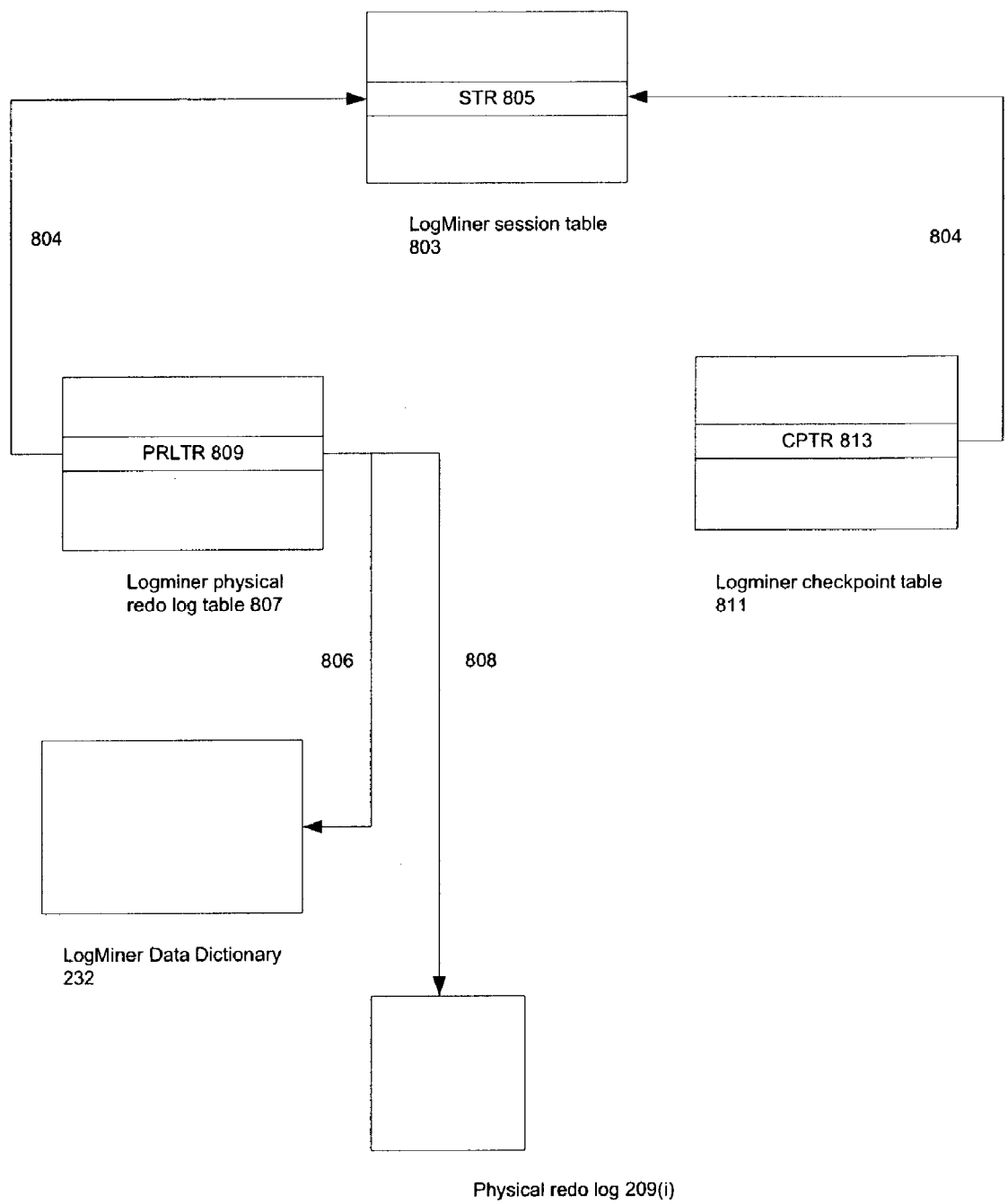
FIG. 8 is an overview of the tables used to relate logical redo logs to LogMiner sessions, physical redo logs, LogMiner data dictionary table 232, and to the state saved in checkpoints.

Overview of a DBMS in which the Invention is Implemented: FIGS. 2 and 8

A preferred embodiment of the invention is implemented in the Oracle9i™ Release 2 DBMS, manufactured by Oracle Corporation, Redwood City, Calif. FIG. 2 is a schematic of the Oracle 9i system that shows those components of the system that are relevant to the present discussion. DBMS 201 has two main components: a computer system 203 which is running the DBMS and a file system 205 that is accessible to DBMS 201. File system 205 includes DBMS program files 213 for the programs that create the DBMS system when they are executed in computer 203 and the data files 207 that contain the data for DBMS 201. As indicated above, the data includes not only the data that the user accesses by means of the DBMS's tables, but also the data that defines those tables. To the programs that interact with DBMS 201, DBMS 201 appears as shown within computer system 203: DBMS 201 includes interfaces 221 by means of which other programs interact with DBMS 201 and database 217. Data stored in database 217 in data blocks 237 is organized into tables including user tables 235 and system tables 229. Included in the latter is data dictionary 231, which is a collection of tables that defines the other tables in the DBMS, including the user tables 235.

DBMS 201 includes the LogMiner utility for making a logical redo log from one or more physical redo logs or portions thereof and making the logical redo log available for data mining and replication. The physical redo logs 209 are stored in file system 205; if a user desires, logical redo logs may also be stored there. File system 205 also includes LogMiner code 215. Interfaces 221 includes interface 223 for the physical redo log, interface 225 for queries, and interface 227 for the LogMiner utility. Included in system tables 229 are LogMiner tables 233. Among these tables are LogMiner data dictionary 232, which is a special dictionary used by the LogMiner utility to produce logical redo logs 211, and V_LOGMNR_CONTENTS view 234, which is a table which is made from a logical redo log 211. Like any other table in database 217, table 234 may be read by means of queries 218.

As regards queries 218 and their results 219, DBMS 201 operates in the same fashion as any standard relational database system. Physical redo log interface 223 produces physical redo log 209(*i*) by making a copy of every data block 237 that is changed in database 217 and writing the copy of the block to a file in physical redo logs 209. The data blocks 237 are written in the order in which the changes are made. Two important consequences of this fact are the following:

Copies of data blocks changed by different transactions 121 are interleaved in a physical redo log 209; and Copies of data blocks are written to physical redo log 209 before the transaction that changed them is committed.

LogMiner interface 227 is the interface for making a logical redo log 211(*i*) from part or all of a physical redo log 209(*i*) and operating on the logical redo log 211(*i*). Interface 227 receives an identification of a portion of a physical redo log 209(*j*) and produces a logical redo log 211(*j*) corresponding to the portion of physical redo log 209(*j*). Using the interface, the user can specify at 214 how long it should take to restart the system from a logical redo log 211 and for data mining purposes, the user can specify at 216 what portion of the physical redo log the user wishes to examine. LogMiner 215 then makes a logical redo log 211 corresponding to that portion of physical redo log 209 and when the logical redo log is finished, LogMiner 215 makes table 234 from the logical redo log 211 in LogMiner tables 233 for the user.

FIG. 8 provides an overview of the system tables in system 201 that are used to relate a logical redo log to the session that has made and is using it, to the physical redo log from which it is made, and to the LogMiner data dictionary table 232 used to make the physical redo log. Also included in these tables is LogMiner checkpoint table 811, which contains the data that is saved when a checkpoint is made in logical redo log 211. The information in table 811 will be described in detail during the discussion of checkpointing.

Beginning with LogMiner session table 803, this table relates a session to the information needed to make a logical redo log from a physical redo log. There is a row in table 803 for each session that is currently active in LogMiner. The fields in a row are as follows:

| | |
|---|---|
| session# | number, |
| client# | number, |
| server# | number, |
| session_name | varchar2(30), |
| db_id | number, |
| session_attr | number, |
| start_scn | number, |
| end_scn | number, |
| checkpoint_scn | number, | session# identifies the LogMiner session. The next set of fields identify the environment in which the session is running client# identifies the client to which the session belongs, server# the database server the LogMiner session is running on, session_name is the name given by the session's user to the session, and db_id is the identifier of the database in which the transactions contained in the logical redo log were made. The remaining fields contain information about the current state of the session. As will be explained in more detail in the following, locations in physical redo logs are identified by system change numbers, or SCN's. start_scn and end_scn are the SCN's of the physical redo blocks at which the logical redo log made for the session will begin and end. checkpoint_scn is the SCN of the most recently-made checkpoint in the logical redo log.

Physical redo log table 807 relates a session to the physical redo logs 209 and the LogMiner Data Dictionaries 232 used to make the logical redo log for the session. There is a physical redo log table row (PLTR) 809 for each use of a physical redo log by a LogMiner session. Different sessions may simultaneously access the same physical redo log and a given session may access a physical redo log at different places.

Figure 3:
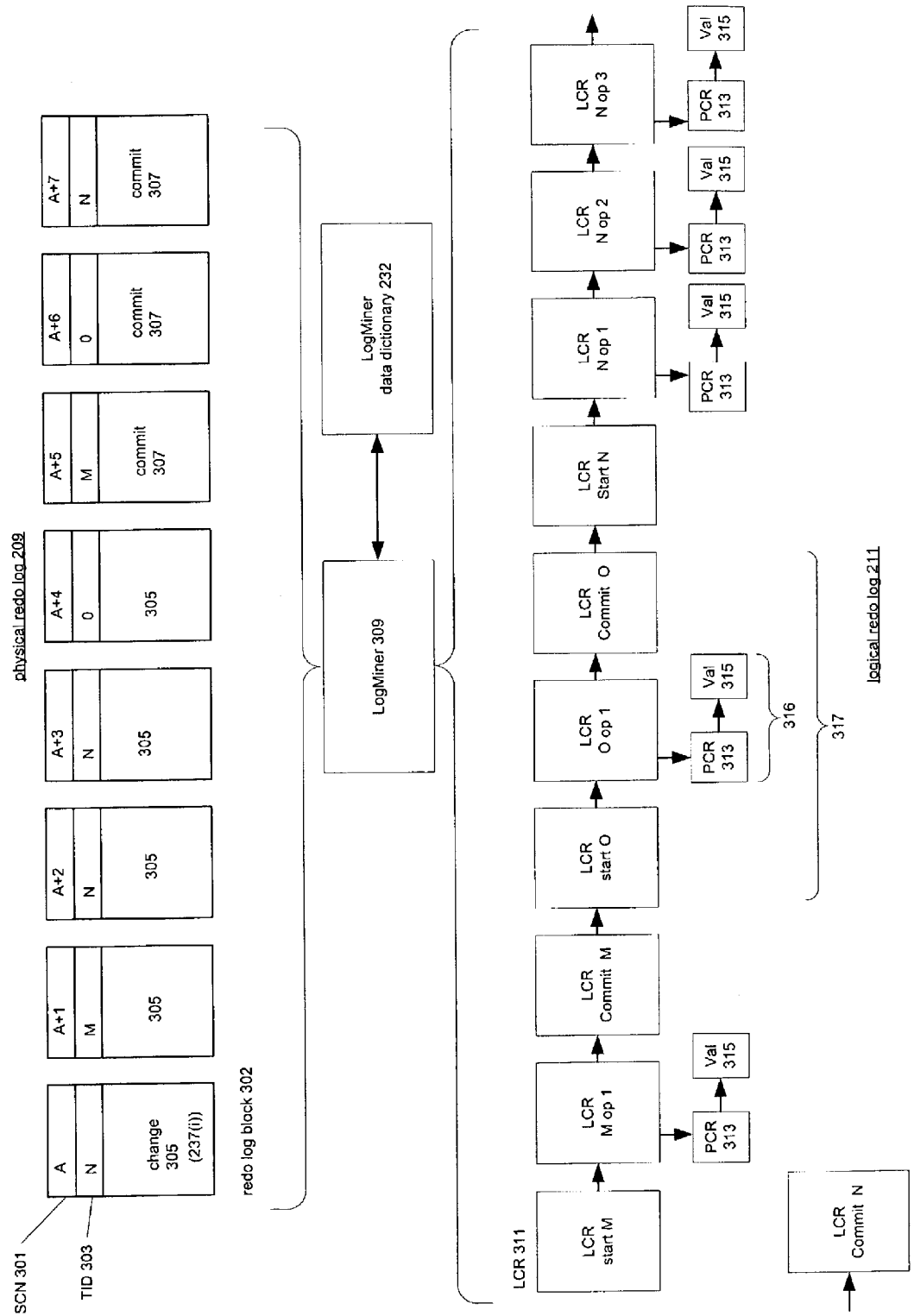
FIG. 3 shows a portion of a physical redo log and the portion of a logical redo log made from the portion of the physical redo log.

Physical and Logical Redo Logs in System 201: FIGS. 3 and 10

FIG. 3 shows a portion of a physical redo log 209 of the type used in DBMS 201 and a portion of a logical redo log made from the physical redo log. Physical redo log 209 in a preferred embodiment is a sequence of redo log blocks 302. For the most part, each block 302 contains a copy of a changed data block in data blocks 237. In addition to the copy of the changed data block, each block 302 contains a SCN 301 and a transaction ID number (TID) 303. SCN 301 identifies a change in the database system and associates the block 302 with that change. A number of blocks 302 may thus have the same SCN. As shown in FIG. 3, the SCN's are monotonically increasing, and can thus be used to specify locations in a physical redo log. TID 303 identifies the transaction that made the change recorded in block 237. When a transaction is committed, that fact is indicated by a commit block 307 in the physical redo log. As can be seen from FIG. 3, the blocks 302 are ordered by increasing SCN, but blocks from different transactions may be interleaved. Thus, in FIG. 3, the blocks of transaction N are interleaved with those of transactions M and O.

LogMiner program 309 produces logical redo log 211 from physical redo log 209 using information from LogMiner data dictionary 232. In logical redo log 211, the information for the transactions is not interleaved; instead, the information for each transaction is grouped, and the order of the groups in logical redo log 211 corresponds to the order by SCN of the commit redo log blocks for the transactions in physical redo log 209. Thus, in log 209 the order of commit records is M, O, N and in log 211, the complete information for transaction M comes first, followed by the complete information for transaction O, and the complete information for transaction N.

In addition to reordering the information from physical redo log 209 as just described, LogMiner program 309 adds information obtained from LogMiner data dictionary 232 so that the DML operation and the table(s) and column(s) it is performed on can be read directly from logical redo log 211. Logical redo log 211 is made up of a sequence of logical change records (LCR's) 311. Each logical change record specifies one of at least the following:

a DML operation
 a transaction start;
 a commit;
 checkpointed state for a transaction The sequence of logical change records for a given transaction includes a transaction start LCR for the transaction, one or more LCR's specifying DML operations performed in the transaction, and a commit LCR for the transaction. The set of LCR's for transaction O is shown at 317. With the DML operations, each LCR points to a list of PCR records 313 that specify the columns affected by the operation; each PCR record 313 points to the value produced in the column by the operation. Such a DML LCR is shown at 316.

Details of the LCR and PCR data structures are shown at 311 and 313 in FIG. 10. Beginning with LCR 311, Operation field 1015 contains the name of the SQL operation represented by the LCR. Num_pcr field 1017 contains the number of PCR's 313 in the chain of PCR's pointed to by the LCR. TXN_id field 1019 identifies the transaction that the LCR belongs to. Object_number 1021 is the data base system's internal number for the database object that the operation recorded in the LCR affects; LogMiner 215 can use this number and Object_version number 1023 in LogMiner data dictionary 232 to find out the object's name and characteristics. As will be described in more detail below, an operation recorded in an LCR may correspond to one or more redo log blocks 302; Low_scn field 1025 is the SCN of the first redo log block 302 to which the LCR corresponds; High_scn field 1027 is the SCN of the last redo log block 302 to which the LCR corresponds. property field 1029 contains information relative to particular kinds of LCR's. PCR_ptr field 1031, finally, is the pointer to the list of PCR's 313 that belong to the LCR.

Continuing with PCR 313, First_column field 1033 contains the lowest column number for which data is contained in the PCR record. Data_ptr 1035 is a pointer to Val 315 for the PCR; Data_size 1037 indicates the size of the data in Val 315.

Figure 4:
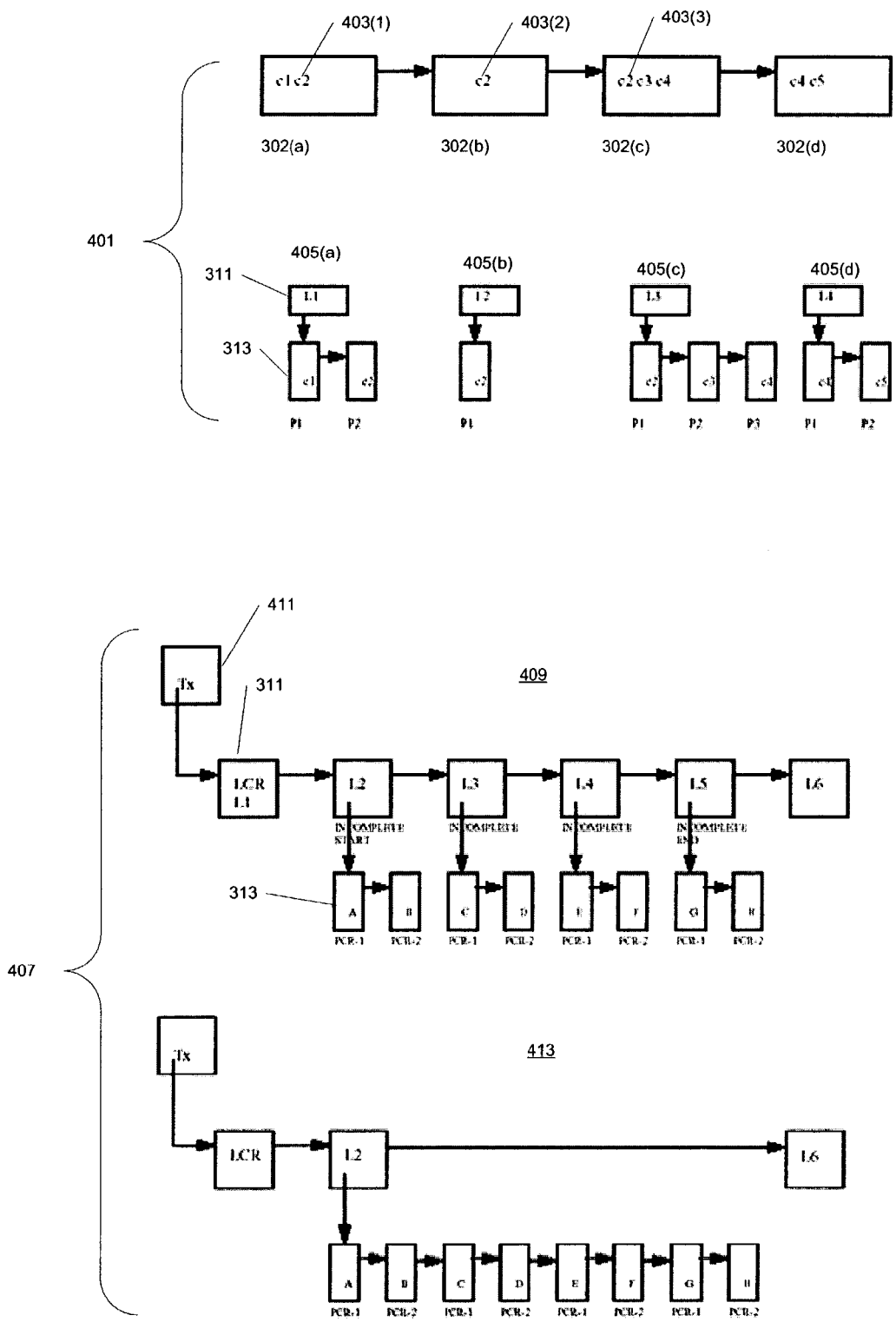
FIG. 4 shows how physical redo log is made into logical redo log.

Making a Logical Redo Log from a Physical Redo Log: FIG. 4

The LogMiner utility produces logical redo log 211 from physical redo log 209 as specified by the user of the LogMiner. For data mining purposes, the user creates a LogMiner session and specifies a range of SCN's in one or more physical redo logs. The LogMiner session then creates logical redo log 211 from physical redo log 209 and then makes table 234 from the logical redo log.

The part of the LogMiner that produces logical redo log 211 in a preferred embodiment has three components: a reader, a preparer, and a builder. The reader reads the physical redo log 209 and orders the redo log blocks by increasing SCN. The preparer makes LCR's 311, PCR's 313, and VALs 315 that provide logical descriptions of the operations described by the redo log blocks. It is the builder's job to relate LCR's to transactions and also to merge incomplete LCR's into a single LCR. The LCR's, PCR's, and VALs are made using the information from the redo log blocks and information from LogMiner data dictionary 232. The builder orders the transactions in logical redo log 211 by the SCN of the commit block 307 in physical redo log 208 for the transaction. As will be described in more detail later, the builder also makes checkpoints in logical redo log 211 by inserting checkpoint LCR's at the proper locations in logical redo log 211.

FIG. 4 shows how the preparer makes LCR's and PCR's from physical redo log blocks and how the builder merges the LCR's for a single DML operation into a single LCR. The first operation is shown at 401. The physical redo log 209 is made up of chained redo blocks 302; here, four such blocks, 302(a . . . d) are shown. A redo block may contain information about changes in one or more columns 403 of a table in DBMS 201. Thus, block 302(a) contains change information for columns c1 and c2. A column's change information may also extend across several redo blocks 302; thus the change information from column c2 extends across blocks 302(a . . . c) and the change information from column c4 extends across blocks 302(c . . . d).

The preparer first makes a structure 405 for each redo block 302(i). The structure contains an LCR 311(i) corresponding to the redo block. The LCR in structure 305(i) has a PCR 313 for each column that has change data in the corresponding redo block 302(i). Thus, at 405(a), there are PCR's for column P1 and the portion of column P2 that is contained in block 302(a). Included in each LCR 311 are the TID 201 and the SCN(s) 301 for its corresponding redo block 302.

As the builder encounters each structure 405, it adds it to a list of such structures for the transaction identified by the structure's TID. In the list, the structures are ordered by SCN.

The builder keeps adding structures 405 to the transaction's list until it encounters the LCR corresponding to a redo block 302 that indicates that the transaction has been committed. It then adds the last LCR corresponding to the "committed" redo block. The result of this process is shown at 409. At the head of the list is a transaction data structure 411. Its contents may be seen at 411 in FIG. 10. First comes Identifier field 1003, which contains the TID 303 for the transaction; then comes a Property field 1005, then a Start_time field that specifies the time at which the transaction begins. Next come Low_scn field 1009 and High_scn field 1011, which indicate the earliest SCN specified in the LCR's that have so far accumulated for the transaction and the highest SCN specified in those LCR's. Num_lcr field 1013 indicates the number of LCR's that have accumulated in the transaction thus far.

Then come the LCR's 311 for the transaction, beginning with a "start transaction LCR (L1) and ending with a "commit" LCR (L6). In this case, the transaction is a single DML operation which spans multiple redo blocks, as indicated by the set of incomplete LCR's L2 through L5 for the DML operation. Since all of these LCR's are for a single DML operation, they can be merged into the single DML LCR L2, as shown at 413. Once the LCR's have been merged into L2, the PCR's can be merged to the extent possible. Once this is done, the list of LCR's 311 for the transaction is placed in the logical redo log in the order specified by the SCN in the "commit" LCR.

Figure 5:
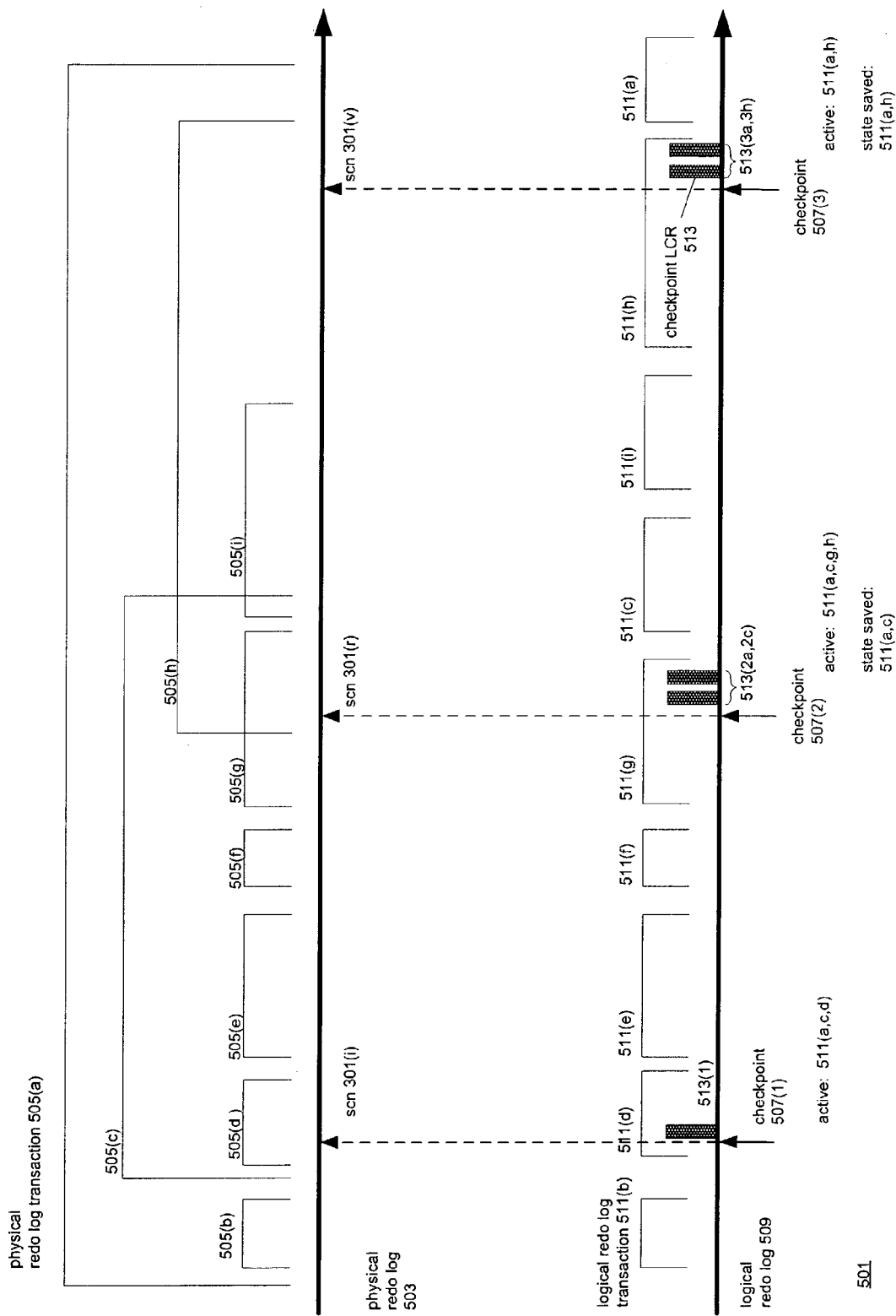
FIG. 5 shows how state is saved at checkpoints in the logical redo log.
Figure 6:
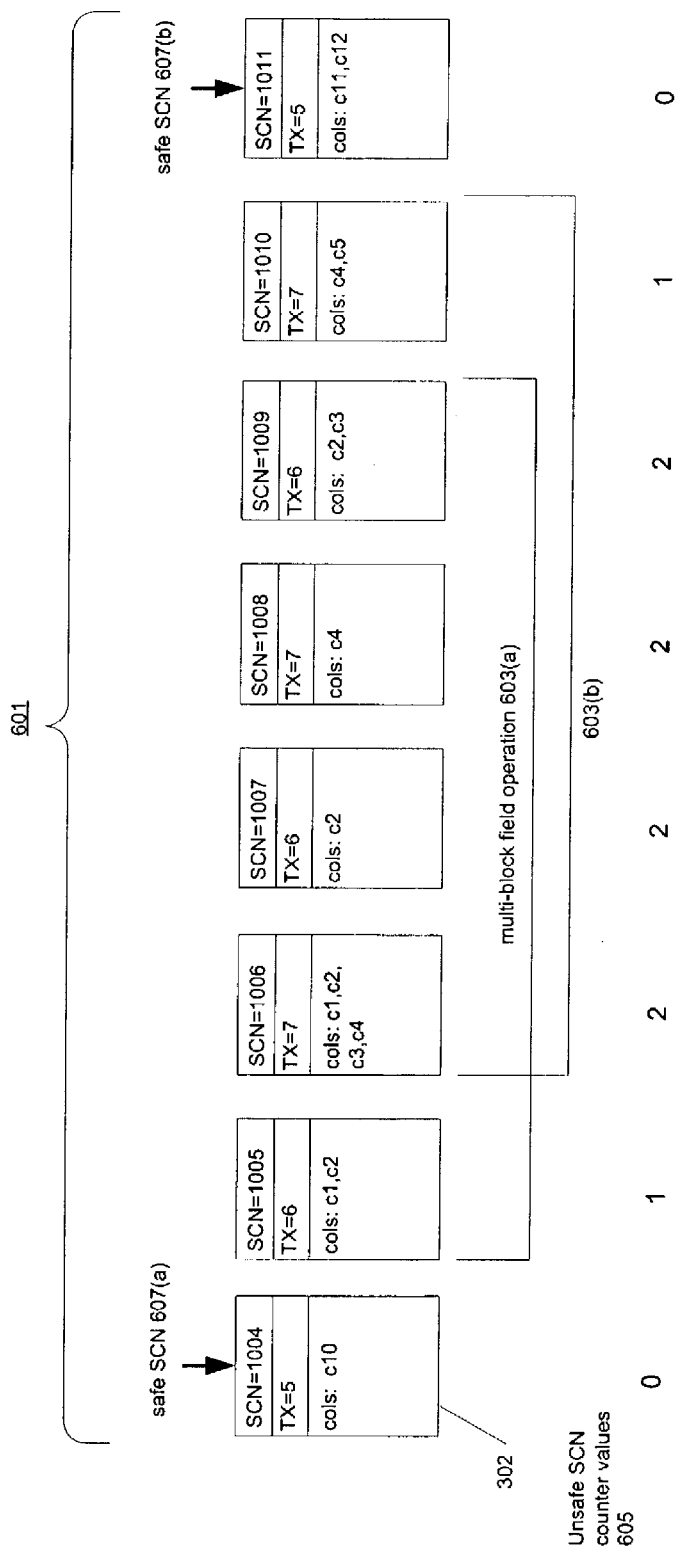
FIG. 6 shows how a safe SCN is located in the physical redo log.

Checkpointing in the Logical Redo Log: FIGS. 5 and 6

As long as the physical redo log is available, a logical redo log can be made from it as described above. The process of making the logical redo log is, however, time consuming, and it is consequently worthwhile to include checkpoints in the logical redo log, so that an extending logical redo log can be made starting at the checkpoint, instead of having to be made starting at beginning of the physical redo log. There are two issues in making checkpoints in the logical redo log:
  minimizing the cost of the checkpoint in terms of both time to make the checkpoint and the amount of storage needed for the checkpoint's state; and
  picking points in the creation of the logical redo log at which the checkpoint may be made.
  Each of these issues is dealt with in the following.

Light-Weight Checkpointing in the Logical Redo Log: FIG. 5

As already noted, the simplest form of checkpointing is to save the current state of every transaction that is active at the time the checkpoint is made. With logical redo log 211, that means saving the list of LCR's 311 and their dependent PCR's 313 and VALs 315 for every transaction that does not yet have a "commit" LCR at the time the checkpoint is made. In large online transaction systems such as those used in commercial Web sites, there may be 10,000 transactions active at a given moment. Checkpoints are made in a preferred embodiment of logical redo log 211 by a technique that is termed in the following lightweight checkpointing. Lightweight checkpointing takes advantage of the following facts:
  most transactions in an on-line transaction system are short; and
  with short transactions, simply remaking the LCR's, PCR's, and VALs of logical redo log 211 for the transaction from physical redo log 209 is less costly than saving the state for the transaction at a checkpoint in the logical redo log 209 and using the saved state to remake the transaction.

FIG. 5 shows how lightweight checkpointing works at 501. At the top of FIG. 5 is shown a portion of a physical redo log 503. In physical redo log 503, redo log blocks 302 are ordered by SCN 201. The redo log blocks 301 for different transactions are interleaved as shown in FIG. 3. The portions of redo log 503 that contain redo blocks for transactions 505(a ... h) are shown by brackets. There are three transactions, 505(a), 505(c), and 505(h), that are "long" relative to the others. At the bottom of FIG. 5 is the logical redo log 509 which Log-Miner 309 makes from the physical redo blocks 302 of physical redo log 503. There is a logical redo log transaction 511(a ... h) corresponding to each of the physical redo log transactions 505(a ... h), but as also shown in FIG. 3, the LCR's for the transactions are not interleaved and the transactions are ordered by the SCN of the commit record in physical redo log 503 for the transaction. Thus, transaction 511(a) follows all of the other transactions in logical redo log 509.

There are three lightweight checkpoints 507(1 ... 3) shown in logical redo log 509. As shown by the dotted arrows, each of these checkpoints 507 corresponds to the SCN 301 of a redo log block 301. How these SCN's are selected will be explained in more detail later. When a lightweight checkpoint is made, the state of any transaction 511 that is active both at the last lightweight checkpoint 507(i) and at the current lightweight checkpoint 507(j) is saved and a checkpoint LCR 513 that points to the saved state for the transaction is inserted into logical redo log 509. The checkpoint LCR includes the SCN 301 corresponding to the checkpoint and the TID of the transaction whose state is being saved. The active transactions 511 at a given checkpoint 507(i) are of course those for which no "commit" LCR has been made. Whether a given active transaction was also active at checkpoint 507(i) can be determined by comparing the SCN for checkpoint 507(i) with the SCN of the first LCR in the list of LCR's for the given transaction. If the SCN for checkpoint 507(i) is greater than the SCN of the first LCR in the given transaction's list of LCR's, the transaction was also active at checkpoint 507(i). Thus, in FIG. 5, there are two transactions that were active at both lightweight checkpoint 507(1) and checkpoint 507(2), namely 511(a) and (c), and there is a checkpoint LCR 513 for each of these transactions at lightweight checkpoint 507(2). Similarly, there are two transactions that were active at both lightweight checkpoint 507(2) and checkpoint 507(3), namely 511(a) and (h), and there is a checkpoint LCR 513 for each of these transactions at checkpoint 507(3).

Details of Lightweight Checkpoints: FIGS. 9 and 10

There is a checkpoint LCR for every transaction which is both active at the SCN at which the lightweight checkpoint is taken and was also active at the SCN at which the last checkpoint was taken. As will be explained in detail below, lightweight checkpoints may be only taken at a safe SCN. Checkpoint LCR's are like other LCR's 311 except in the following respects:
  operation field 1015 specifies a checkpoint;
  there are no object changes or PCR's associated with the checkpoint LCR; and
  the SCN's specified in the LCR are the SCN of the safe SCN at which the checkpoint was taken.

The state of the transactions that are both active when the lightweight checkpoint is taken and were also active when the previous lightweight checkpoint was taken is stored in Log-Miner checkpoint table 811. There is a checkpoint table row (CPTR) 813 in the table for each checkpoint LCR in the logical redo logs currently being managed by the LogMiner.

FIG. 10 shows the fields of CPTR 813. Session# field 901 contains the number of the session for which the LogMiner is making the logical redo log which is being checkpointed. Checkpt_scn field 903 contains the SCN at which the checkpoint was taken. The fields 907, 909, and 911 together make up a unique TID 909 for the transaction whose state is associated with the LCR to which the entry belongs. That LCR is identified by the values in TID 909 and Checkpt_scn field 903.

When a checkpoint LCR is made in the preferred embodiment, it may represent state for the checkpoint LCR's transaction which is specified by the client for whom the checkpoint is made as well as the state that is saved as required for the lightweight checkpoint. The value of STATE field 913 indicates whether it contains such client-specified state. If it does, the state is stored in the bit large object (BLOB) which contains the value of CLIENT_DATA field 917. What state is saved in field 917 and how it is interpreted are determined completely by the client. In a preferred embodiment, LogMiner saves the data specified by the client in field 917 after it has stored the state required to construct an extending logical redo log.

One example of the kind of information that may be stored in field 917 and of how the client may use such information is the following: A database system may have two database systems A and B. B uses the logical redo log made by A to replicate changes in A and A uses the logical redo log made by B to replicate changes in B. A problem with this arrangement is that B's replication of A causes changes in B which are recorded in the logical redo log and vice-versa. However, the changes in B caused by the replication of A are of no interest to A, since those changes are already in A. The same is true of the changes in A caused by the replication of B. Client-specified state can be used to solve this problem. In this case, the client-specified state is a change source field associated with each transaction whose state is being saved at the checkpoint. The value of the change source field indicates whether the transaction was originally done in A or B. The client in A that is making the logical redo log for use in B knows whether a particular transaction whose state is being saved at the checkpoint was replicated from B, and when it was, the change source field for the transaction is set to B when the state is saved at the checkpoint. Otherwise, it is set to A The client in B that does the replication from the logical redo log examines the change source field for each transaction whose state was saved at the checkpoint and does not replicate those transactions whose change source field indicates B. Replication from B to A works the same way. The state required to do the lightweight checkpoint is stored in CKPT_DATA field 915. The saved state is the contents of transaction specifier 411 for the transaction and of the LCR's 311, PCR's 313, and values 315 for the transaction as they exist at the time the checkpoint is made. The state is stored in the BLOB associated with field 915.

Making an Extending Logical Redo Log Using a Light-Weight Checkpoint

When the LogMiner makes an extending logical redo log 509 using lightweight checkpoints 507, it proceeds as follows:

1. It finds the first checkpoint 5070) preceding the point at which the extending logical redo log 509 is to begin. The point at which extension is to begin is specified by an SCN.
2. It finds the next preceding checkpoint 507(*i*). Beginning at checkpoint 507(*i*), the LogMiner reads the physical redo log between checkpoint 507(*i*) and checkpoint 507(*j*) to recreate the LCR's and associated data structures corresponding to the redo log blocks for transactions which become active after checkpoint 507(*i*).
3. On reaching checkpoint 507(*j*), the LogMiner restores the state of any transaction 511 whose state is accessible from the checkpoint LCR's 513 associated with checkpoint 507 (*j*) and then continues reading the physical redo log and creating the LCR's and associated data structures until it reaches the point at which the extending logical redo log is to end.

When this procedure is applied to FIG. 5 and the creation or recreation of the logical redo log is to begin at an SCN>SCN 301(*v*), but less than the SCN for the next checkpoint 507(4), LogMiner reads backward along logical redo log 509 until it finds the checkpoint LCR's 513 associated with checkpoint 507(2). LogMiner begins processing the physical redo log blocks 302 for new transactions following the SCN specified in the check point LCR's associated with checkpoint 507(2). The state of transactions 511(*a*) and (*h*) is accessible via checkpoint LCR's associated with checkpoint 507(3), so the state of these transactions is restored at checkpoint 507(3), and the LogMiner then processes all of the physical redo log blocks 302 whose SCN's are greater than SCN 301(*v*) until it reaches the point at which the extending logical redo log 509 is to end. As can be seen from the foregoing, the effect of the above procedure is to order the logical redo transactions 511 beginning at checkpoint 507(3) in exactly the same order as if the physical redo log 503 had been read from its beginning. As is also apparent from the foregoing, the extending logical redo log 509 can begin at any point in logical redo log 509 which is preceded by two checkpoints 507. Points that are not preceded by two checkpoints 507 are so close to the beginning of logical redo log 509 that making extending logical redo log 509 from the beginning of physical redo log 503 is not particularly expensive.

It should be pointed out here that any technique may be used to indicate a point in physical redo log 503; for example, a time stamp in the log may be used instead of an SCN. Further, where the prior point in the physical redo log is associated with a redo log block 302 and the redo log block 302 marks the beginning of a transaction, how that transaction is treated in the algorithm is a matter of implementation: the algorithm may consider the transaction either to be one of those which is active at the prior point or one of those which becomes active after the prior point.

It should also be pointed out here that in the above extension algorithm, checkpoint 507(*i*) serves only a single purpose: to indicate a point in the transaction stream. The state saved at checkpoint 507(*i*) is not required for the extension algorithm, and consequently, checkpoint 507(*i*) can be replaced by a data structure that merely indicates checkpoint 507(*i*)'s SCN. An embodiment which might employ this approach is one where a logical redo log always has a single checkpoint at the end of the logical redo log. An SCN could be selected that was at a given distance from the end of the logical redo log and that SCN could be used to determine whether a transaction's state had to be saved at the checkpoint.

Selecting "Safe" SCN's for Lightweight Checkpoints. FIG. 6

One of the complications of checkpointing logical redo log 211 is that a checkpoint 507 may not simply be inserted at any point in logical redo log 211. The checkpoint 507 may only be inserted at points in the logical redo log corresponding to points in the physical redo log where taking the checkpoint will not interfere with an ongoing operation. Since points in the physical redo log are marked by SCN's, the points in physical redo log 209 corresponding to points in logical redo log 211 at which checkpoints may be inserted are termed herein safe SCN's. In physical redo log 209, there are two situations where taking a checkpoint will interfere with an ongoing operation:

when the operation affects a field whose value extends across more than one redo block 302; such fields will be termed in the following multi-block fields; and during a Data Definition Language (DDL) transaction.

A DDL transaction is one that changes a table definition and thus also changes the LogMiner data dictionary 232. When such a transaction occurs, the change to the LogMiner data dictionary must have been made before the physical redo log blocks 302 following the committed DDL transaction can be properly interpreted in making logical redo log 211; consequently, a checkpoint 507 may correspond to a physical redo log SCN which is less than that at which the DDL transaction begins or is greater than the SCN at which the DDL operation is committed, but may not correspond to an SCN within that range.

FIG. 6 shows an example of safe SCN's and how they may be determined. Shown in FIG. 6 is a sequence of physical redo log blocks 302 whose SCN's range from 1004 through 1011. The physical redo log blocks 302 belong to three transactions: TX 5, 6, and 7. Transactions 6 and 7 include operations which affect multi-block fields. Thus, transaction 6 has an operation on the field corresponding to column 2 of its row. That field extends across the blocks 302 with SCN's 1005, 1007, and 1009, and is thus a multi-block field. Operations involving multi-block fields are termed herein multi-blockfield operations, or MBFOs. The SCN for a physical redo log block 302 that is involved in a multi-block field operation is not a safe SCN. In FIG. 6, the blocks involved in a MBFO in transaction 6 are shown by square bracket 603(*a*); those involved in a MBFO in transaction 7 are shown by square bracket 603(*b*). Brackets 603(*a*) and (*b*) together span blocks 302 with SCN's ranging from 1005 through 1010, and hence the only safe SCN's 607 in FIG. 6 are 1004 and 1011. One way of detecting unsafe SCN's is to use an unsafe SCN counter which is incremented whenever an MBFO operation or a DDL transaction begins in physical redo log 302 and decremented whenever an MBFO operation or a DDL transaction ends. If the unsafe SCN counter has a value greater than 0 when a physical redo log block 302 is being processed to produce logical redo log 211, the physical redo log block 302 is unsafe and its SCN is not a safe SCN. The values of the unsafe redo log counter are shown at 605 in FIG. 6, where it can be seen that they are 0 only for the blocks 302 with SCN's 1004 and 1011, and these are the safe SCN's 607(*a*) and (*b*).

Determining how Often to Take a Checkpoint

In general, determining how often to take a checkpoint in logical redo log 211 is a matter of balancing the cost in processing time and memory of taking the checkpoint against the cost of rereading redo log blocks 302. More specifically, the longer the interval between checkpoints, the fewer transactions there will be that are active both at a checkpoint 5070) and its preceding checkpoint 507(*i*), but the more redo log blocks 302 will have to be read.

The analysis that needs to be performed in an optimal embodiment to determine whether a checkpoint should be taken is the following:

1. Assume that LogMiner processes physical redo logs 209 at P MByte/sec, and can write (or read) checkpoints at a rate of C MByte/sec.
2. Say at any given point in time we have "S" Mbyte of unconsumed data that requires processing of "L" redo logs 209 to gather. Thus it is beneficial to take a checkpoint if $2S/C < L/P$ Since "S" (and as a result L) can change with time, whether or not to take a checkpoint is a difficult question to answer. Moreover computing S takes CPU cycles (L can be computed simultaneously with S), so the question becomes how often should S be computed. Thus S=f(point in time we compute S). The same is true for L. Thus finding S and L in an optimal way is not feasible in polynomial time. LogMiner takes the following approach in approximating the optimal solution. The user is asked to provide a MTTR in seconds (say Y seconds). This means that if the rate of processing redo records is P Mbyte/Sec, then LogMiner can take checkpoints after processing P×Y Mbytes of redo record and still satisfy the user's request. In the LogMiner code, the reader process injects a RECOVERY_CHECKPOINT LCR in the stream after it has processed P×Y/2 Mbytes of redo. The factor of 2 is added to cover for the cases when a checkpoint can not be taken because of ongoing DDL or MBFO operations. This approach keeps the computation costs to a minimum, and guarantees that in a well-behaved redo stream at least one checkpoint will be taken every P×Y Mbytes of redo records processed. Determining how often a checkpoint is to be taken in logical redo log 211 can be done in two different contexts: data mining and replication.

Determining how Often a Checkpoint is to be Taken in Data Mining

A data miner begins a data mining session by specifying the physical redo logs 209 that he or she wishes to mine and a range of SCN's within the physical redo logs. Lightweight checkpoints 507 in the logical redo logs 211 corresponding to the portions of the physical redo logs being mined make it possible for the data miner to examine a range of SCN's that extends beyond the range of SCN's originally specified without having to construct the extending logical redo log for the extended range from the beginning of the physical redo log. The LogMiner creates the extending logical redo log 211 by finding the two checkpoints 507(*i*) and (*j*) closest to the end of the existing range and then proceeding from checkpoint 507 (*i*) as described above to construct the extending logical redo log 211. For example, the data miner can first mine the logical redo log in the SCN range (100-10,000) and then mine the logical redo log in SCN range (10,000-20,000) without having to recreate the logical redo log from SCN 100 through SCN 10,000. The same technique can be used to make a logical redo log which extends a logical redo log that the user has saved.

Determining how Often a Checkpoint is to be Taken in Replication

Frequency of checkpoints is interesting in the replication context when logical redo log 211 is being used to restore an instance of a database system after a failure. In such a case, the manager of the database system locates the checkpoint 507(*j*) immediately preceding the location of the failure in logical redo log 509 and the checkpoint 507(*i*) preceding that checkpoint and begins making an extending logical redo log 509 as described above from physical redo log 503 beginning at checkpoint 513(*i*) using the state saved at checkpoint 507(*j*). When the extending logical redo log 509 is complete, database system 201 is restarted, the transactions recorded in extending logical redo log 509 are redone from checkpoint 513(*i*) on to restore the database, and the system continues on from there. The time required to restore the database system will of course depend on the time required to make extending logical redo log 509, and that in turn will depend on the intervals between checkpoints 507 in logical redo log 509.

If there is a requirement that there be a predictable time between failure of a database system and its restoration, the intervals at which the checkpoints are taken may be calculated to provide restoration within the predictable time. One way of doing this is to receive a mean time to recovery (MTTR) value from the user and have the LogMiner use information it has about the time it takes to make a logical redo log from a physical redo log and the MTTR value to compute an interval between checkpoints that should produce the desired MTTR. The user can specify the MTTR value using a simple graphical user interface.

Finding a Safe SCN: FIG. 7

Of course, the SCN at which the LogMiner determines that a checkpoint should be taken may not be a safe SCN. FIG. 7 shows pseudocode for ensuring that the checkpoint is taken at the first safe SCN following the SCN at which it was determined that the checkpoint should be taken. Shown in FIG. 7 is a portion 701 of the code for the builder. At 703 is the portion of the builder's main routine, builder_code, that is of interest; at 719 is the function checkpoint_if_you_can, which builder_code 703 calls whenever LogMiner 309 determines that a checkpoint should occur. The behavior of the part of builder_code shown here is determined by two variables: ForceCheckPoint_krvxsctx 705, which is a flag that indicates whether a checkpoint should be taken at the next safe SCN, and CountTroubleMaker_krvsctx 707, a counter which indicates that the current SCN is a safe SCN when the counter's value is 0. Variable 707 implements the unsafe SCN counter of FIG. 6.

When the reader portion of LogMiner determines that a checkpoint should occur, for example because it has read the number of redo log blocks that correspond to the MTTR specified by a user, it places a RECOVERY_CHECKPOINT LCR in the queue of redo log blocks 302 which it is making for the preparer. When builder_code 703 reaches the RECOVERY_CHECKPOINT LCR, it calls checkpoint_if_you_can 719. That function determines at 721 whether counter 707 has the value 0; if it does, the function calls a function do_checkpoint which saves the state required for the light-weight checkpoint and places TAKE_CHECKPOINT_NOW checkpoints LCR 513 specifying the saved state into logical redo log 509. If counter 707 has any other value, flag 705 is set to TRUE, as seen at 723. In builder_code 703, whenever the start of a multi-block row operation or a DDL transaction is seen, counter 707 is incremented (709); whenever the end of such an operation or transaction is seen, counter 707 is decremented (711). At 713, if a checkpoint is pending (indicated by the value of flag 705) and the counter 707 has the value 0, the checkpoint is made as described above (715) and flag 705 is set to FALSE (717). Thus, if the reader places a RECOVERY CHECKPOINT LCR in redo block sequence 302 at SCN 1008 in FIG. 6, when the builder processes the RECOVERY CHECKPOINT LCR, it calls checkpoint_if_you_can 719, which, because counter 707 has the value 2, will not insert a TAKE_CHECKPOINT_NOW LCR 513 into logical redo log 211, but will instead set flag 705 to TRUE. It will remain TRUE until counter 707 reaches the value 0, which will happen at safe SCN 607(b), and at that time, the checkpoint will be taken and the TAKE_CHECKPOINT_NOW LCR inserted into logical redo code 211.

CONCLUSION

The foregoing Detailed Description has disclosed to those skilled in the relevant technologies how to make and use checkpoints according to the invention and has further disclosed the best mode presently known to the inventors of making and using the checkpoints. The inventors use their checkpoints in conjunction with the redo logs produced by a relational database system, and their implementations of their inventions are necessarily determined in general by the characteristics of the relational database system in which they are implemented and in particular by the systems for physical and logical redo logging in the database system. It will, however, be immediately apparent to those skilled in the relevant technologies that the invention is in no way restricted to the relational database system in which it is implemented or even to database systems generally, but can be employed in any system which logs a stream of transactions.

In any system in which the inventions are implemented, the particular manner in which the invention is implemented will depend on the manner in which the stream of transactions is represented and the purposes to be achieved by the logging and the checkpointing, as well as on the implementation tools available to the implementers and on the underlying systems in which the checkpoints will be made and used. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A method of making a checkpoint in a log of a stream of transactions, the method being executed by a computer processor in a database management system, the checkpoint representing a point in the transaction stream and specifying saved state, the specified saved state being used to extend the log from the specified point, and the method comprising:
   selecting the point in the transaction stream which the checkpoint represents in the log; and
   saving the saved state, the stat that is required to be saved being only the state of all transactions that are active both at the point and at a prior point in the stream.

2. The method of making a checkpoint set forth in claim 1 wherein:
   each transaction includes one or more operations; and
   in the step of selecting a point, the point is selected such that no operation is unfinished at the point.

3. The method of making a checkpoint set forth in claim 2 wherein:
   the transaction stream contains blocks affected by the operations;
   a single operation in the transaction affects a plurality of the blocks; and
   the point specifies a block and is selected such that the selected block is not a block that is affected by an operation that affects a plurality of the blocks.

4. The method of making a checkpoint set forth in claim 1 wherein:
   the method is practiced in a database system that includes a data dictionary;
   the transaction stream includes transactions which affect the data dictionary; and
   the point is selected such that no transaction which affects the data dictionary is uncommitted.

5. The method of making a checkpoint set forth in claim 1 further comprising the step of:
   saving additional state specified by a client in the checkpoint.

6. The method of making a checkpoint set forth in claim 5 wherein:
   the step of saving additional state is performed after the state has been saved in the checkpoint.

7. The method of making a checkpoint set forth in claim 5 further comprising the step of:

receiving an indication from the client whether the additional state is to be saved, the step of saving additional state being performed in accordance with the indication.

8. The method of making a checkpoint set forth in claim 5 wherein:
the additional state is per-transaction.

9. The method of making a checkpoint set forth in claim 1 wherein:
the log in which the checkpoint is made is a logical log of the stream of transactions that is made from a physical log of the stream of transactions;
in the step of selecting a point, the point is selected in the physical log; and
in the step of saving state, the state is saved at a point in the logical log that corresponds to the selected point in the physical log.

10. The method of making a checkpoint set forth in claim 9 wherein:
in the physical log, information about different ones of the transactions is interleaved;
in the logical log, the information about the different ones of the transactions is not interleaved and is ordered in the logical stream by the order in which the transactions were committed; and
in the step of saving state, the state that is saved is that of those transactions which were uncommitted at the prior point and remain uncommitted at the selected point in the physical log.

11. The method of making a checkpoint set forth in claim 9 wherein:
the physical log is made up of blocks of information;
a single operation in a transaction of the stream of transactions affects a plurality of the blocks of information; and
in the step of selecting a point, the point specifies a block of information and is selected such that the specified block is not affected by an operation that affects a plurality of the blocks.

12. The method of making a checkpoint set forth in claim 9 wherein:
the information in the logical log includes information from a data dictionary as well as information from the physical log;
the transactions includes transactions which affect the data dictionary; and
in the step of selecting a point, the point is selected such that no transaction which affects the data dictionary is uncommitted.

13. A method of making a log of a stream of transactions that extends a previously-made log from a checkpoint in the previously-made log, the method being executed by a computer processor in a database management system, the checkpoint representing a point in the stream of transactions and providing access to saved state that is required only to include the state of all transactions that are active both at the point represented by the checkpoint and at a prior point in the previously-made log that corresponds to a prior point in the stream, the method comprising the steps of:
making the extending log beginning at the prior point in the previous log; and
when the checkpoint is reached, using the saved state to which the checkpoint gives access to continue making the extending log.

14. The method set forth in claim 13 wherein:
in the step of making the extending log, only transactions that become active after the prior point are included in the extending log until the checkpoint is reached.

15. A method of determining where to make checkpoint from which a log of a transaction stream can be extended, the method being executed by a computer processor in a database management system, extension of a log from a given checkpoint requiring processing of information about the transaction stream beginning from a checkpoint prior to the given checkpoint and the method comprising the steps of;
receiving an input from a user of a system in which the log is being made indicating a desired period of time between when production of the extended log begins and the extended log becomes available; and
making checkpoints in the log such that a point at which a checkpoint is made in the log is determined at least in part by the desired period of time.

16. The method set forth in claim 15 wherein the method further comprises the step of:
determining from past behavior of the system an amount of the information about the transaction stream which can be processed during the desired period of time.

17. The method set forth in claim 15 wherein the step of receiving an input further comprises the step of:
providing the user with a graphical user interface for indicating the desired period of time.

18. A method of creating a checkpoint in a logical log of a stream of transactions that is made using a physical log of the stream of transactions, the method being executed by a computer processor in a database management system, the checkpoint representing a point in the physical log and specifying saved state, the specified saved state being used to extend the logical log from the specified point, and the method comprising the steps of:
selecting a point in the physical log; and
in the logical log, making a checkpoint at a point in the logical log that corresponds to the selected point by saving the saved state, the state that is required to be saved being only the state of all transactions that were uncommitted at a prior point in the physical log and are still uncommitted at the point in the physical log represented by the checkpoint.

19. The method of creating a checkpoint set forth in claim 18 wherein
the point cannot be in certain regions in the physical log; and
in the step of selecting a point, the point is selected such that the point is in none of the certain regions.

20. The method of creating a checkpoint set forth in claim 19 wherein the step of selecting a point comprises the steps of:
receiving a specification of a point for a checkpoint in the physical log; and
if the specified point is in any of the certain regions, selecting another point that is not in any of the certain regions.

21. The method of creating a checkpoint set forth in claim 20 wherein:
the other point follows the specified point in the physical log.

22. The method of creating a checkpoint set forth in claim 19 wherein:
the information in the physical log is contained in blocks;
a single operation performed in a transaction of the transactions affects a plurality of the blocks of information; and
the plurality of blocks is one of the certain regions.

23. The method of creating a checkpoint set forth in claim 19 wherein:
the information in the logical log includes information from a data dictionary;

the transactions include transactions which affect the data dictionary; and a transaction which affects the data dictionary is one of the certain regions.

24. The method of making a checkpoint set forth in claim 18 further comprising the step of:

saving additional state specified by a client in the checkpoint.

25. The method of making a checkpoint set forth in claim 24 wherein:

the step of saving additional state is performed after the state has been saved in the checkpoint.

26. The method of making a checkpoint set forth in claim 24 further comprising the step of:

receiving an indication from the client whether the additional state is to be saved, the step of saving additional state being performed in accordance with the indication.

27. The method of making a checkpoint set forth in claim 24 wherein:

the additional state is per-transaction.

28. A method of making a logical log of a stream of transactions that extends a previously-made logical log from a checkpoint in the previously-made logical log, the method being executed by a computer processor in a database management system, the logical logs being made from a physical log of the stream of transactions, the checkpoint representing a point in the physical log, and the checkpoint providing access to saved state that is required to include only the state of all transactions that are uncommitted at both the point represented by the checkpoint and a prior point in the physical log, the method comprising the steps of:

making the extending logical log beginning at the prior point in the physical log; and when the checkpoint is reached, using the saved state to which the checkpoint gives access to continue making the extending logical log from the physical log.

29. The method of making a logical log of a stream of transactions set forth in claim 28 wherein:

in the step of making the extending logical log, only transactions that become active after the prior point are included in the extending logical log until the checkpoint is reached.

30. The method of making a logical log of a stream of transactions set forth in claim 28 wherein:

the previously-made logical log has been made from a first portion of the physical log and the method further comprises the step of:

receiving a specification of a second portion of the physical log; and the step of continuing to make the extending logical log continues until the end of the second portion is reached.

31. The method of making a logical log of a stream of transactions set forth in claim 30 wherein:

the logical log is used for data mining.

32. The method of making a logical log of a stream of transactions set forth in claim 30 wherein:

the logical log is used to replicate the transactions.

33. The method of making a logical log of a stream of transactions set forth in claim 28 wherein:

a failure occurs in a system which uses a logical log made in another system to replicate transactions made in the other system;

the point of failure is a point which follows the checkpoint in the logical log; and the extended logical log is used to restore the system.

34. The method of making a logical log of a stream of transactions set forth in claim 33 wherein:

the checkpoint is one of a plurality thereof in the logical logs; and the method further comprises the step of:

receiving a specification of a frequency with which the checkpoints are made in the logical log.

35. The method of making a logical log of a stream of transactions set forth in claim 34 wherein:

the specification of the frequency is determined using a mean time to begin extending the logical log.

36. The method of making a logical log of a stream of transactions set forth in claim 35 wherein the step of receiving a specification of the frequency further comprises the step of:

providing the user with a graphical user interface for indicating the mean time to begin extending the logical log.

37. A database management system comprising:

a computer processor, a memory;

the system configured to create a log of a stream of transactions, the log comprising:

information about the transactions in the stream; and a checkpoint representing a point in the stream of transactions, the log being extendable from the checkpoint and the checkpoint providing access to saved state that is required only to include the state of all transactions that are active both at that point and at an earlier point in the stream.

38. The system set forth in claim 37 wherein:

the log contains information about committed transactions and the saved state to which the checkpoint provides access includes at least the state of all transactions that were uncommitted at the earlier point and are still uncommitted at the point represented by the checkpoint.

39. The system set forth in claim 37 wherein:

the checkpoint represents a point in the stream of transactions that substantially corresponds to the end of the log.

40. The system set forth in claim 37 wherein:

the checkpoint is one of a plurality thereof, each checkpoint of the plurality representing a point in the stream of transactions; and the earlier point in the stream is a point which another of the checkpoints of the plurality represents.

41. The system set forth in claim 37 wherein:

the point represented by the other checkpoint is the prior point represented by a checkpoint that is closest to the point represented by the checkpoint.

42. The system set forth in claim 37 wherein:

the distance between the points in the stream is determined such that there is an upper bound to the time required to begin extending the log from a last checkpoint in the log to include further transactions.

43. The system set forth in claim 37 further comprising:

additional client-defined saved state to which the checkpoint provides access.

44. The system set forth in claim 43 wherein:

the additional client-defined saved state is optional in the checkpoint and the log further comprises:

an indication in the checkpoint as to whether client-defined state is to be saved.

45. The system set forth in claim 43 wherein:

the additional client-defined saved state is per-transaction.

46. The system set forth in claim 37 wherein:

the log further comprises a plurality of log elements, an element corresponding to a point in the stream of transactions; and the checkpoint comprises a checkpoint element for each of the transactions to whose state the checkpoint gives access, each of the checkpoints elements corresponding to the point represented by the checkpoint in the stream of transactions and the checkpoint element for a given transaction giving access to that transaction's state.

47. A database management system comprising:
a computer processor,
a memory;
the system configured to create a checkpoint that checkpoints a log of a stream of transactions, the checkpoint representing a point in the stream of transactions and the checkpoint comprising:
a specifier for the point in the stream to which the checkpoint represents; and
a specifier for saved transactions state, the saved transaction state being required only to include the state of all transactions that are active both at the point which the checkpoint represents and at an earlier point in the stream.

48. The system set forth in claim 47 wherein:
the log contains information about committed transactions; and
the saved state specified by the specifier includes at least the state of all transactions that were uncommitted at the earlier point and are still uncommitted at the point represented by the checkpoint.

49. The system set forth in claim 47 further comprising:
additional client-defined saved state to which the checkpoint provides access.

50. The system set forth in claim 49 wherein:
the additional client-defined saved state is optional in the checkpoint and
the log further comprises:
an indication in the checkpoint as to whether client-defined state is to be saved.

51. The system set forth in claim 49 wherein:
the additional client-defined saved state is per-transactions.

52. The system set forth in claim 47 wherein:
the log further comprises a plurality of log elements, an element corresponding to a point in the stream of transactions; and
the checkpoint comprises a checkpoint element for each of the transactions to whose state the checkpoint gives access, each of the checkpoints elements corresponding to the point represented by the checkpoint in the stream of transactions and the checkpoint element for a given transaction giving access to that transaction's state.

53. A method of determining where to make a checkpoint in a logical log of a stream of transactions, the method being executed by a computer processor in a database management system, the logical log being made from a physical log comprising blocks indicating changes made by transactions in the stream and certain of the blocks being unsafe for checkpointing, the method comprising the steps of:
determining a first block in the physical log that corresponds to a point in the transaction stream that should be represented by a checkpoint; and
if the first block is unsafe, finding a safe block, the checkpoint being made to represent a point in the transaction stream that corresponds to the safe block.

54. The method of determining where to make a checkpoint set forth in claim 53 wherein:
the changes include changes in values resulting from operations performed in transactions;
a single changed value is stored in a plurality of blocks; and
a block is unsafe if the block is one of a plurality in which a single changed value is stored.

55. The method of determining where to make a checkpoint set forth in claim 53 wherein:
the logical log includes information that is based on a data dictionary;
the transactions include transactions that change the data dictionary; and
a block is unsafe if it is included in a portion of the physical log in which a transaction that changes the data dictionary is active.

56. The method of determining where to make a checkpoint set forth in claim 53 wherein:
the changes include changes in values resulting from operations performed in transactions;
a single changed value is stored in a plurality of blocks;
the logical log includes information that is based on a data dictionary;
the transactions include transactions that change the data dictionary; and
a block is unsafe if the block is either one of a plurality in which a single changed value is stored or the block is included in a portion of the physical log in which a transaction that changes the data dictionary is active.

57. The method set forth in claim 53 wherein:
in the step of finding a safe block, the safe block follows the first block in the physical log.

58. The method set forth in claim 57 wherein:
in the step of finding a safe block, the safe block is the first safe block following the first block.

59. A database management system comprising:
a computer processor,
a memory;
the system configured to create a log of a stream of transactions, the log comprising:
information about the transactions in the stream; and
a checkpoint representing a point in the stream of transactions, the checkpoint providing access to saved state used to make an extending log that extends the log from the point in the stream represented by the checkpoint and to additional client-defined saved state.

60. The system set forth in claim 59 wherein:
the additional client-defined saved state is optional in the checkpoint and
the log further comprises:
an indication in the checkpoint as to whether client-defined state is to be saved.

61. The system set forth in claim 59 wherein:
the additional client-defined saved state is per-transaction.

62. A database management system comprising:
a computer processor,
a memory;
the system configured to create a checkpoint that checkpoints a log of a stream of transactions, the checkpoint representing a point in the stream of transactions and the checkpoint comprising:
a specifier for the point in the system which the checkpoint represents;
a first specifier for saved transaction state that is used to make an extending log that extends the log from the point in the stream represented by the checkpoint; and
a second specifier for additional client-defined saved state.

63. The system set forth in claim 62 wherein:
the additional client-defined saved state is optional in the checkpoint and
the log further comprises:
an indication in the checkpoint as to whether the client-defined state is to be saved.

64. The system set forth in claim 62 wherein:
the additional client-defined saved state is per-transaction.

* * * * *

UNITED STATES PATENT AND TRADEMARK OFFICE
CERTIFICATE OF CORRECTION

PATENT NO. : 7,890,466 B2  
APPLICATION NO. : 10/414591  
DATED : February 15, 2011  
INVENTOR(S) : Kundu et al.

Page 1 of 1

It is certified that error appears in the above-identified patent and that said Letters Patent is hereby corrected as shown below:

In column 1, line 4-5, below "TECHNIQUES FOR INCREASING THE USEFULNESS OF TRANSACTION LOGS" delete "CROSS REFERENCES TO RELATED APPLICATIONS".

In column 4, line 55, delete "log." and insert -- log; --, therefor.

In column 6, line 49, after "running" insert -- . --.

In column 8, line 7, delete "property" and insert -- Property --, therefor.

In column 10, line 21, delete "5070)" and insert -- 507(j) --, therefor.

In column 11, line 37, after "A" insert -- . --.

In column 11, line 55, delete "5070)" and insert -- 507(j) --, therefor.

In column 13, line 25, delete "multi-blockfield" and insert -- multi-block field --, therefor.

In column 13, line 52, delete "5070)" and insert -- 507(j) --, therefor.

In column 13, line 64, after "L/P" insert -- . --.

In column 16, line 32, in Claim 1, delete "stat" and insert -- state --, therefor.

Signed and Sealed this  
Twenty-fourth Day of January, 2012

David J. Kappos  
*Director of the United States Patent and Trademark Office*